July 20, 1965
R. E. OAS ETAL
3,196,021
REFRIGERATED COMESTIBLE PACKAGE
Original Filed July 29, 1963
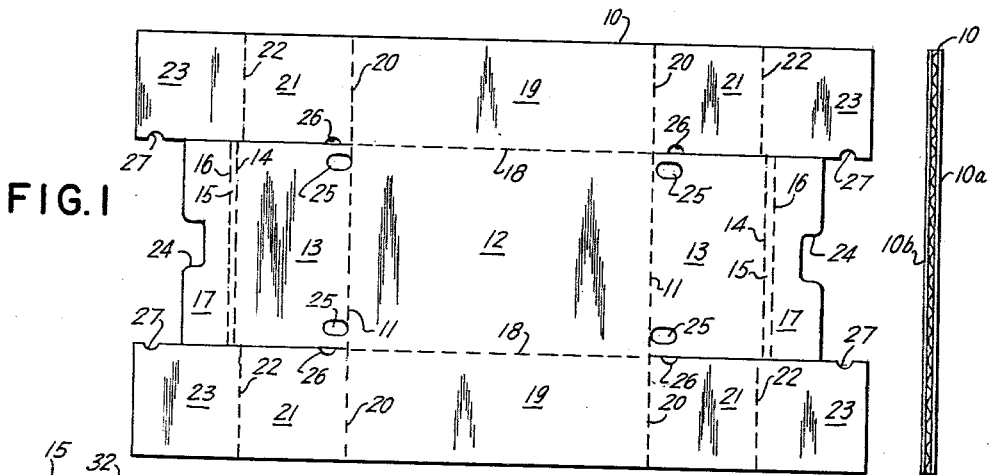
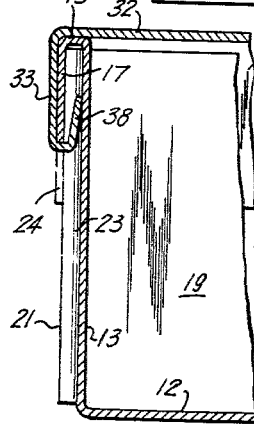
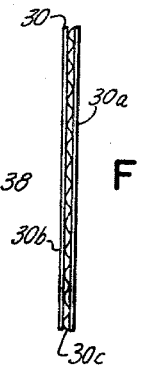
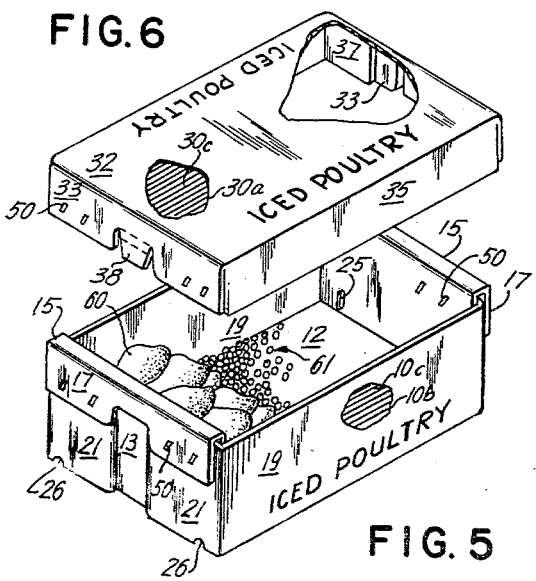
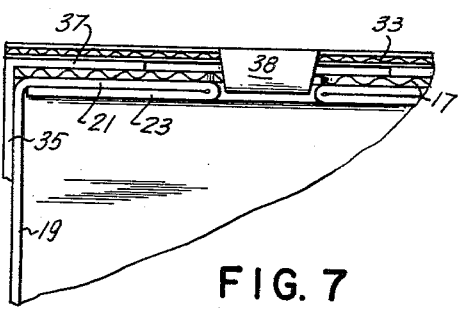
INVENTOR.
RICHARD E. OAS
CARROL P DAHILL
HUGH B. JOHNSON
BY
ATTORNEY

United States Patent Office 3,196,021
Patented July 20, 1965

3,196,021
REFRIGERATED COMESTIBLE PACKAGE
Richard E. Oas, Summit, N.J., Carroll P. Dahill, Statesville, N.C., and Hugh B. Johnson, Georgetown, S.C., assignors to International Paper Company, New York, N.Y., a corporation of New York
Original application July 29, 1963, Ser. No. 298,269. Divided and this application June 19, 1964, Ser. No. 389,232
9 Claims. (Cl. 99—192)

This is a division of U.S. Serial No. 298,269, filed July 29, 1963.

This invention relates to the packaging, shipment, and protection of comestible articles. More particularly, it relates to corrugated paperboard container blanks, the containers formed therefrom, the packaging in which such containers are used and the method of packaging with cooling agents in which such containers are employed.

The present invention is of particular significance in the shipment of freshly killed and eviscerated poultry in ice. It has, heretofore, been the general practice to ship this type of food in wirebound wooden crates, but such crates give rise to a number of problems, all of which the present invention obivates or overcomes.

Perhaps the prime concern of the shipper of fresh poultry by truck or rail from, for instance, Atlanta, Georgia to Chicago, Illinois is the avoidance of contamination leading to spoilage. Such contamination can come both from within and without the shipping container or package. Accordingly, it is desirable to get away from the slatted wood and wire crates now in use which allow water from ice melted in one crate, splinters, and foreign objects to flow or pass into another neighboring crate or one stacked below and allow such foreign matter to gain entrance between the slats and cause contamination of the poultry meat. Additional contamination and spoilage can come from exposed poultry and parts thereof which can, and often do, protrude through the slats.

Further, it is desirable to heighten the insulation provided by any iced fresh poultry container or packaging; to maintain or improve its strength notwithstanding the assault made thereon by the melting ice in which the poultry must be packed; and, yet, to reduce packaging bulk and weight, if that is at all possible, so as to make the most efficient use of available shipping space. Adequate drainage of melted ice from the container in a manner to avoid its admission to other like containers is also most important.

Again, elimination of the presence of wood which splinters and wires which tear is welcome both to the workmen handling fresh poultry boxes and their ultimate recipients, as is adequate stacking strength in the containers used therefor. And, in reverse order, the poultry distributor or a chain store manager has a major interest in being provided with a printable container, rather than a slatted wood and wire box whereon stapled or pasted labels are short-lived in the presence of ice, water, grease, and rough handling, so that the handler can be given explicit, printed handling instruction and others can be informed or persuaded by an advertising message.

What has been specified above as desirable is achieved by the present invention, along with other objects which will become evident from the disclosure hereinafter to those skilled in the art. And it is all accomplished by, broadly, a resort to corrugated paperboard instead of wooden slats and wire and the like.

Of course, not all corrugated paperboard is suitable for the purpose here being considered. For, not all corrugated paperboard has the requisite printability and resistance to water, grease, and cold or, in other words, the necessary high wet strength, wet rigidity, and resistance to facial penetration by water, water vapor, gases, grease, and organic fluids commonly involved in the packaging of fresh meat, produce, and dairy products.

Thus, it has been found that particular attention must be paid to the choice of components, i.e., liners and corrugated medium, which go into making the single or multi-wall corrugated paperboard to be used in the present invention and to the choice of the additives, formative steps, and manufacturing conditions involved in its production. Without such attention the corrugated paperboard used for the container of the invention would not, for instance, retain or have the improved wet strength and rigidity, i.e., the high resistance to burst, tear, crush, and tensile stresses under conditions of prolonged ice and water exposure or water immersion, which provided the basis of selection of one more of its components.

By way of example of the type of materials chosen and the care exercised in their utilization in the present invention, a preferred corrugated paperboard made in accordance therewith has liners which are wet strength resin treated, wax impregnated kraft linerboard, available commercially under the trademarks "Hydro Kraft" and "Gator Pak" owned by International Paper Company, and a corrugated medium which is wet strength resin treated, high rigidity, semi-chemical hardwood paperboard, available commercially under the trademark "Hydro Chem" owned by International Paper Company. The wet strength resins are normally added to the paper pulp before a sheet is formed therefrom on a Fourdrinier wire, but the wax impregnation of the individual liner board face surfaces is accomplished either prior to or in tandem with the combination of the liners and medium on the corrugator. Such wax must, of course, be of a refined quality suitable for use in contact with foods and it is applied with particular regard respecting its temperature, wax applicator control settings, and point of application so as to assure linear board receptivity to the wax and also continued printability of the outer linear. On the other hand, the corrugated medium is impregnated with a molten blend of waxes and thermoplastic resins— at a rate of about 8 lbs. per 1000 square feet—ahead of, or in tandem with, the corrugator, using bath temperatures and paper preconditioning, after heating to increase the depth of impregnation, and re-moisturizing to insure satisfactory bonding performance on the corrugator wherein, preferably, waterproof, resorcinol-starch adhesive formulations are utilized. Then, the combined corrugated paperboard can be printed, if the linerboards were not already pre-printed when they entered the corrugator, and is coated on both sides with a blend of petroleum waxes and natural or synthetic copolymers.

Once having in hand the corrugated paperboard of the present invention or an equivalent thereof, container blanks are stamped from sheets of it by well-known means and with standard equipment. But, this converting operation has a most important, not to say critical, feature, even as there have been shown to be such features in the corrugating operation. This feature entails juxtapositioning the blank dies and corrugated paperboard sheets so that the flutes of the corrugated medium in the resulting container blanks and the containers produced therefrom will be disposed predominantly longitudinally thereof. And the object of this feature is to assure that, in the finished containers, the minimum number of flute openings will, in the normal course, be disposed to accept debilitating water or the like.

More specifically, with regard to the blanks and containers of the present invention, the blanks in question constitute a body member and a cover member and the containers are comprised of a body and cover which can readily be secured or locked on the body as a final step of a process or method of packaging comestible articles, e.g., fresh poultry, and a cooling agent, e.g., ice chips or shavings, in the containers. The container body is provided with reinforced ends to give it torque and bottom sag resistance and to bolster the integrity and strength given it by the material of its construction, simple fastening means by which it is secured erect, efficient and non-contaminating drainage means, and channel means or cut-out portions to receive the lock bolt or tongue provided by the container cover and actuated by the container packer. For a more complete understanding of these aspects of the present invention, reference should be had to the attached drawings in which—

FIGURE 1 depicts a plan view of a blank of a comestible article container body member in accordance with the present invention;

FIGURE 2 depicts an end view of the blank of FIGURE 1;

FIGURE 3 depicts a plan view of a blank of a comestible article container cover member in accordance with the present invention;

FIGURE 4 depicts an end view of the blank of FIGURE 3;

FIGURE 5 depicts an exploded isometric view of the container body and cover erected from the blanks of FIGURES 1 and 3;

FIGURE 6 depicts a sectional side view of the container body and cover of FIGURE 5 locked together; and FIGURE 7 depicts a sectional plan view, taken from below, of the container body and cover of FIGURE 5 locked together.

In FIGURES 1 and 2, the container body blank 10 is shown to be made from corrugated paper board comprised of two liners 10a and 10b lying on either side of the corrugated or fluted medium 10c. It is also shown to be divided into several panels by means of scores or foldlines. Thus, foldlines 11 separate rectangular bottom panel 12 from end panels 13; foldlines 14 separate end panels 13 from ledge panels 15; and, fold lines 16 separate ledge panels 15 from end flaps 17. Again, foldlines 18 separate bottom panel 12 from side panels 19; foldlines 20 separate side panels 19 from end supporting panels 21; and, foldlines 22 separate end supporting panels 21 from end supporting flaps 23.

FIGURES 1 and 2 also reflect the orientation of the flutes of corrugated medium 10c with respect to body blank 10, i.e., predominantly longitudinally thereof, and the provision of cut-out portions 24 which are disposed centrally along the outer edges or ends of end supporting flaps 23. In addition, they show spaced-apart orifices 25 in end panels 13 along foldlines 11 and vents 26 and 27 along the sides (next adjacent end panels 13 and end flaps 17) of end supporting panels 21 and end supporting flaps 23, respectively. Orifices 25 are shown in their preferable configuration, i.e., limited in their width to cross a minimum number of flutes in the corrugated medium, and extending to, and preferably tangential to, foldlines 11, so as to assure unblocked drainage. Vents 26 and 27 are seen to be substantially equidistant in each case from foldlines 22.

In FIGURES 3 and 4, the container cover blank 30 is shown to be made from corrugated paperboard comprised of two liners 30a and 30b lying on either side of the corrugated or fluted medium 30c. It is also shown to be divided into several panels by means of scores or foldlines. Thus, foldlines 31 separate rectangular top panel 32 from terminal flaps 33; foldlines 34 separate panel 32 from lateral flaps 35; and, foldlines 36 separate lateral flaps 35 from terminal supporting flaps 37.

FIGURES 3 and 4 also show the orientation of the flutes of corrugated medium 30c with respect to cover blank 30, i.e., predominantly longitudinally thereof, and the provision of tongues centrally and inwardly of the outer edges or ends of terminal flaps 33 and the connection of such tongues to such flaps along double foldlines 39.

FIGURE 5 shows the results of erecting a container body and cover from blanks 10 and 30 by making folds along the several foldlines which hingedly connect the several panels and flaps and fastening such panels and flaps in place with, for example, rust resistant staples 50 or adhesives or heat sealing materials.

In the container body, end panels 13 and side panels 19 are disposed substantially perpendicularly to bottom panel 12 and ledge panels 15 are disposed substantially perpendicularly to end panels 13. Again, end flaps 17 are substantially perpendicularly disposed with respect to ledge panels 15. Similarly, end supporting panels 21 and end supporting flaps 23, which are caused to lie abuttingly against each other by a folding along foldlines 22 (preferably by the manufacturer), are disposed substantially perpendicularly to side panels 19 in a manner such that flaps 23 abut the outsides of end panels 13. Then, by means of staples 50, end panels 13, end flaps 17, end supporting panels 21, and end supporting flaps 23 are secured together.

In the container cover, terminal flaps 33 and lateral flaps 35 are disposed substantially perpendicularly to top panel 32 and terminal supporting flaps 37 are disposed substantially perpendicularly to both top panel 32 and lateral flaps 35 with flaps 37 abutting the insides of terminal flaps 33. There, flaps 33 and 37 are secured together with staples 50.

FIGURE 5 further emphasizes additional structural features which are most important, not to say critical, in the container and its use in packaging in accordance with the present invention. These include the placement into registration upon the container's erection of orifices 25 and vents 26 and 27 to form drainage holes in the container. They also include the juxtapositioning of corrugated media 10c and 30c so that their flute openings are minimally exposed to debilitating moisture or water in the normally disposed container. Rather, such flute ends face downwardly or to one side. Again, they include ledge panels 15 which yield both an assured purchase for the cover or the body and a firm foundation when several of the containers are stacked, one upon another. Then too, they include a characteristic of printability in the corrugated paperboard of the container, so that informational indicia, whether of an instructive nature (dealing, for instance, with handling directions) or an advertising nature (reflected in the legend "Iced poultry" shown in FIGURE 5), can be made a part of the entire package, in addition to the container and the contents of, for example, chickens 60 and ice 61.

FIGURES 6 and 7 bring out the features of the container of the present invention which permit such container to be secured and, thereafter, resecured and which are utilized in packaging method of such invention. These features include cutout portions 24 of the container body and tongues 38 of the container cover and they come into play when the container's contents have been disposed therein and the cover has been placed over the body so as to rest upon ledge panels 15 of the body. The container handler can then manually cause tongues 38 to move, along the path provided by the channel between panels 21 (FIGURE 5) and through cut-out portions 24 and to be turned upwardly, so that they find themselves disposed between flaps 17 and end panels 13 fore and aft and between the corner posts furnished by end supporting panels 21 and end supporting flaps 23 on either side.

Another advantage of the container of the present invention which should be emphasized is that it furnishes entirely smooth interior surfaces enabling the prevention of damage by such container to the articles contained or packed therein.

What is claimed is:

1. A comestible articles package comprising comestible articles and a cooling agent disposed in a container comprising a body and a cover of corrugated paperboard having its flutes disposed predominantly longitudinally of the body and the cover and having characteristics of printability and resistance to water, grease, and cold, the body including a rectangular bottom panel, end panels each hingedly connected at one end to one end of the bottom panel along a foldline and disposed perpendicularly to the bottom panel, ledge panels each hingedly connected at one end to the other end of an end panel along a foldline and disposed perpendicularly to the end panel, end flaps each having a length shorter than an end panel length and hingedly connected at one end to the other end of a ledge panel along a foldline and disposed perpendicularly to the ledge panel, side panels each hingedly connected at one side to one side of the bottom panel along a foldline and disposed perpendicularly to the bottom panel, end supporting panels each having a length shorter than one-half of an end panel width and hingedly connected at one end to one end of a side panel along a foldline and disposed perpendicularly to the side panel and outwardly of an end panel, and end supporting flaps each having a length shorter than one-half of an end panel width hingedly connected at one end to the other end of an end supporting panel along a foldline and disposed parallely to the end supporting panel and inwardly thereof and the cover including a rectangular top panel, terminal flaps each hingedly connected at one end to one end of the top panel along a foldline and disposed perpendicularly to the top panel, lateral flaps each hingedly connected at one end to one side of the top panel along a foldline and disposed perpendicularly to the top panel, and terminal supporting flaps each hingedly connected at one end to one end of a lateral flap along a foldline and disposed perpendicularly to the lateral flap, and wherein the top panel abuts the ledge panels, the lateral panels abut the side panels, and the terminal supporting flaps abut the end flaps.

2. A package in accordance with claim 1 wherein first means fasten together the end panels, end flaps, end supporting panels, and end supporting flaps and second means fasten together the terminal flaps and terminals supporting flaps.

3. A package in accordance with claim 1 wherein means define centrally disposed cut-out portions along the other ends of the end flaps.

4. A package in accordance with claim 1 wherein means define spaced-apart orifices in the end panels adjacent the foldlines between the bottom panel and the end panels.

5. A package in accordance with claim 1 wherein means define vents along the sides of the end supporting panels and the end supporting flaps next adjacent the end panels and the end flaps.

6. A package in accordance with claim 5 wherein the vents are spaced equidistantly from the foldlines between the end supporting panels and the end supporting flaps.

7. A package in accordance with claim 1 wherein means define spaced-apart orifices in the end panels adjacent the foldlines between the bottom panel and the end panels, means define vents along the sides of the end supporting panels and the end supporting flaps next adjacent the end panels and the end flaps, and the orifices and the vents are in registration.

8. A package in accordance with claim 1 wherein means define centrally disposed tongues inwardly of the other ends of the terminal flaps, each tongue being hingedly connected to its terminal flap along double foldlines.

9. A package in accordance with claim 8 wherein the tongues are disposed through the cut-out portions and between the end panels and the end flaps.

References Cited by the Examiner
UNITED STATES PATENTS

| 1,592,824 | 7/26 | Fairchild | 156—210 |
| 2,864,545 | 12/58 | Royce | 229—15 X |
| 2,987,236 | 6/61 | Strine | 229—34 |
| 3,111,412 | 11/63 | Mouk et al. | 99—192 |

A. LOUIS MONACELL, *Primary Examiner.*

RAYMOND N. JONES, *Examiner.*